Sept. 6, 1966   G. MESSNER   3,271,289
MERCURY CATHODE ELECTROLYTIC CELL HAVING AN ANODE WITH HIGH
CORROSION-RESISTANCE AND HIGH ELECTRICAL
AND HEAT CONDUCTIVITY
Filed Oct. 10, 1963   5 Sheets-Sheet 1

INVENTOR
GEORG MESSNER
BY
Hammond & Littell
ATTORNEYS

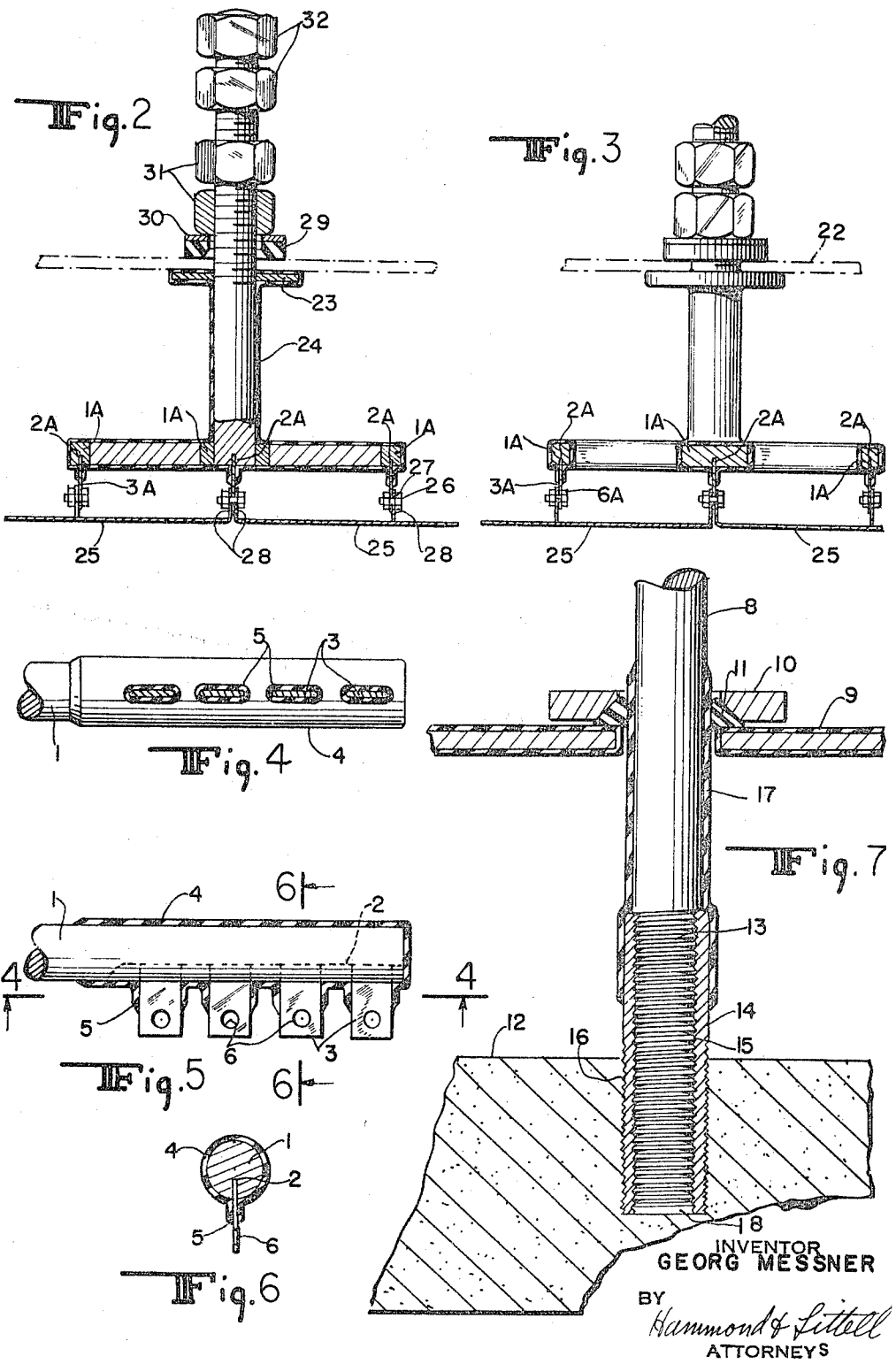

INVENTOR.
GEORG MESSNER

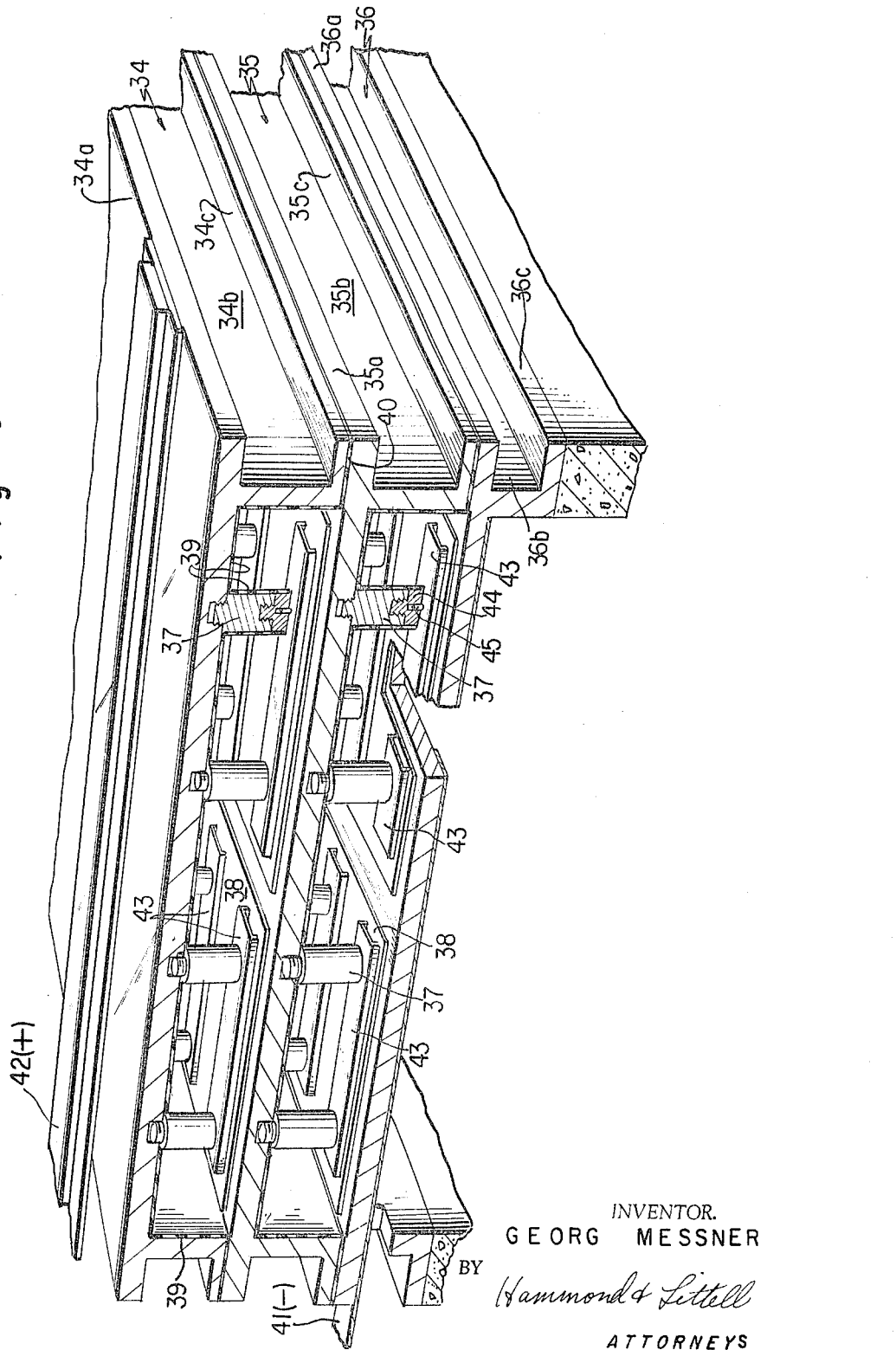

3,271,289
MERCURY CATHODE ELECTROLYTIC CELL HAVING AN ANODE WITH HIGH CORROSION-RESISTANCE AND HIGH ELECTRICAL AND HEAT CONDUCTIVITY
Georg Messner, Milan, Italy, assignor to Oronzio de Nora Impianti Elettrochimici, Milan, Italy
Filed Oct. 10, 1963, Ser. No. 315,181
Claims priority, application Germany, July 22, 1959, O 6,894
4 Claims. (Cl. 204—219)

This is a continuation-in-part of application Serial No. 44,301, filed July 21, 1960, now abandoned.

The invention relates to a method for forming an anode in which a metal having a high electrical and heat conductivity, but lacking corrosion-resistance, is joined to a metal having high corrosion-resistance, wherein the highly conductive metal is coated with a layer of a corrosion-resistant material whereby the metallic component possesses both high conductivity for electricity or heat and is corrosion-resistant. This invention relates to electrodes in electrolytic cells, and more particularly to horizontal or inclined plane type cells which use a flowing mercury cathode.

Within recent years certain combination materials have been developed which are very useful as electrodes, such as the combination of titanium metal with a very thin layer of platinum metal, which is in some cases as good as platinum used alone as an anode. In these composition materials the titanium serves as the current conductor for the microscopically thin layer of platinum. As long as this composition material is used with low current values, the voltage drop within the titanium conductor is in most cases acceptable, both from the point of view of loss in electrical energy as well as undesirable heat generation. The situation is different, however, in the case of current intensities of hundreds and thousands of amperes in a single electrode which are customary in the art. The electrical conductivity of titanium is about 30 times less than that of copper and the price of titanium is so many times more than the price of copper, that in order to achieve equal electrical conductivity values in titanium and copper, the cost of titanium would not only be several hundred times that of copper but the dimensions of the titanium work pieces would be such that they could not be used in practice solely from the technical point of view.

In order to remedy this situation, it was thought that the titanium may be used as coating metal for the sufficiently conductive copper or that other good conductors could be used. However, the obstacle to this concept is the difficulty of working the titanium in contact with base metals. This difficulty is not only based on the fact that titanium cannot be soldered but also that good deposits of dense titanium have heretofore not been feasible on base materials such as copper or aluminum. Instead, contact is achieved only by pressure, for example by screw pressure contact of the titanium with the satisfactorily conductive base metal. However, even this method is not very feasible without a possibility of covering the portions of these types of compositions which are not resistant to corrosion.

It is an object of this invention to provide an anode structure for electrolytic cells of the horizontal and inclined plane type having a combination metallic component from a metal having high electrical and heat conductivity and low corrosion-resistance and a metal having high corrosion-resistance wherein the conductive metal is protected by a layer of corrosion-resistant material whereby the entire component has high conductivity and high resistance to corrosion.

It is a further object of this invention to provide a corrosion-resistant connection between current conductors and electrodes in electrolytic cells.

Another object is to provide a method for forming a corrosion-resistant pressure connection for anodes between the metals copper and titanium.

Yet another object is to provide an anode structure for electrolytic cells having copper for the conductive elements and titanium for the base of the anode plate wherein the copper elements are protected from corrosion by a layer of corrosion-resistant material.

These and other objects will become apparent as the description thereof proceeds.

I have now found that the above difficulties may be overcome and the objects attained in a very satisfactory manner by protecting the above-mentioned pressure connections between conductive and corrosion-resistant metals by means of a continuous ebonite or other suitable coating over all of the metals involved, the ebonite cover overlapping the titanium surfaces by at least several millimeters.

More specifically my invention consists of forming connections for anodes in electrolytic cells or to the anode structures themselves, used in horizontal and inclined plane cells, making use of corrosion-resistant metals for the anode plates, such as titanium and highly conductive metals such as copper. The configuration of the various metal parts is unimportant, and they may have any form such as sheets, plates, bars, rods, tubes and the like as well known in the art. The composite anode structure generally has supporting rods which are substantially perpendicular to the cell base. The supporting rods are also the conductive members and make contact with the electric current source such as the bus bars. At the lower end of the supporting rods, the anode plates are attached substantially perpendicular to the rods, so that they lie in a plane substantially parallel to that of the cell base. The plates are a corrosion-resistant metal and may have a thin platinum coating on the face adjacent the cell base. The anode plates are connected to the conductive metal by an intermediate corrosion-resistant member, and as pointed out, the ebonite coating covers the conductive supporting rod, part of the intermediate corrosion-resistant member and the joint between them. This type of structure is useful in horizontal and inclined plane cells having a flowing mercury cathode which flows over the cell base.

The contact between the metals copper and titanium is made by pressure. The connection may be produced by bolts or screws to hold one metal to the other. In addition, the titanium sheet may be inserted into grooves in copper rods which can be crimped to form a pressure fit. The titanium may also be formed as an internally threaded tube which screws onto a threaded copper rod.

Thus, as indicated above, the form of the metallic components and the type of pressure connection may vary. However, in all cases, the covering of ebonite is applied to the joint between the two metals. This layer extends on the conductive metal to the point were it is no longer subject to corrosion. In my composite electrode, the ebonite covering is applied to the copper conductor inside the electrolytic cell and extends to the casing or just outside the casing. The ebonite covering covers the joint between the copper conductor metal and the titanium metal, covering bolts, screws, or tubes, etc. and extending a few millimeters over the titanium surface beyond the joint.

In copper-titanium electrodes, it is sometimes desirable to coat the copper with a layer of tin. The titanium surface may be plated with a thin layer of platinum, if desired.

Thus, the invention consists of the use of metals having desirable and undesirable properties in a composite electrode structure, wherein the advantages of each are obtained and the disadvantages are avoided and to the composite anodes for electrolytic cells. The advantages are that the high conductivity of copper is obtained, while avoiding its corrosiveness, and the non-corrosive property of titanium is obtained while avoiding its poor conductivity. Moreover, when the anode plate is platinum coated titanium, the anode has a long life and does not require adjustment of the distance between the anode face and the cathode face of the cell.

Referring to the figures which illustrate specific embodiments of my invention,

FIGURE 1 illustrates an anode structure having a frame of a conductive metal and plates of a non-corrosive metal.

FIGURES 2 and 3 illustrate a cross-sectional view of the anode of FIG. 1 taken along the lines 2—2 and 3—3 respectively, showing the anode attached to a cell cover, the contact between metal components and the ebonite covering of the conductive metal elements.

FIGURES 4 and 5 illustrates top and side views respectively of the type of metallic connection used in the anode structure illustrated in FIGURES 1, 2 and 3.

FIGURE 6 is a cross-sectional view of the connection of FIG. 5 taken along the lines 6—6.

FIGURE 7 illustrates an end view of an anode connection showing a conductive anode suspension rod threaded to a non-corrosive metallic tube which is threaded into a graphite anode plate, and the ebonite covering of the copper rod and connection.

FIGURE 10 illustrates a perspective view of a partial cross-section of a multi-tier arrangement of horizontal electrolytic cells.

Figure 1:
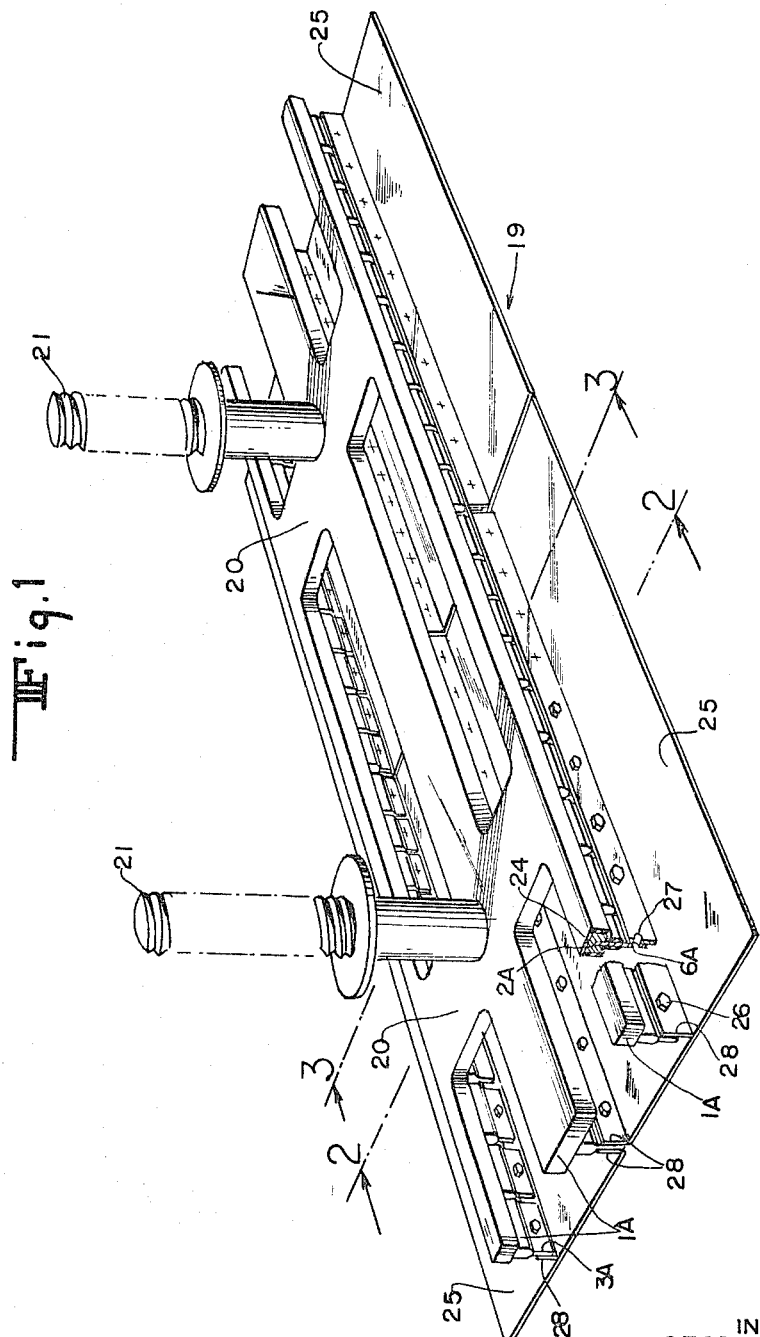

In order to further illustrate my invention, the following specific embodiments are described. It will be understood, however, that the invention is not limited to the precise structures and materials recited.

Referring to FIGURES 4, 5 and 6, one embodiment of my invention was produced as follows:

A round copper rod 1 which was 50 mm. thick and 2.5 m. long was provided at one place on its circumference with a groove 2 which has 10 mm. deep and 4 mm. wide, so that it ran parallel to the axis. Sand-blasted titanium sheets 3 which were 240 mm. long and 150 mm. wide were pressed into groove 2 at intervals of about 20 mm. The thickness of the titanium sheets 3 was a few $\frac{1}{100}$ mm. greater than the internal width of groove 2 in the round copper rod 1. An interval of 20 mm. was left between the individual titanium sheets 3. Thereafter, the round copper rod was tin-plated at moderately elevated temperature and the entire assembly was then covered with a layer of ebonite 4 so that the entire copper surface and the adjacent zones of the titanium sheets 3 were covered, the outer edge 5 of the ebonite cover 4 being no closer to the copper than 10 mm. at any point. Apertures 6 were provided in titanium sheets 3 at those places which were not covered with the ebonite covering 4 for attaching anodes, not shown, which may be made either of graphite, platinized titanium, magnetite, or tantalum.

In another embodiment of the connection illustrated by FIGURES 4, 5 and 6, a round copper rod was prepared so that the longitudinal groove 2 was a few tenths of a millimeter wider than the thickness of the titanium sheets 3. The copper rod 1 was then tin-plated on all sides even inside the longitudinal groove 2, so that the strips of titanium sheets 3 could be readily inserted without friction into groove 2. The titanium sheets 3 were provided with a thin coating of a platinum-type metal on the edge to be inserted into groove 2, the platinum coating corresponding in width to the depth of groove 2 in copper rod 1. After inserting titanium sheets 3, the particular places on the copper rod 1 are pressed together by means of a high pressure press, so that groove 2 in copper rod 1 becomes much narrower and so that titanium sheets 3 can no longer be pulled out of the groove by applying a moderate force. The portion of the titanium sheets 3 which extended below the copper rod was then sand-blasted and subsequently the tin-plated copper rod 1 and the adjacent portion of the titanium sheets 3 were covered with ebonite layer 4 as described above. The actual anode plates, not shown, were attached to titanium sheets 3 which have, in some places, at least a platinized surface plated around the circumference of apertures 6.

The connection of FIGURES 4, 5 and 6 may be used in a composite anode structure 19 of the type shown in FIGS. 1, 2 and 3. In anode 19, three longitudinal, parallel copper bars 1A similar to rods 1 of FIGS. 4, 5 and 6 by tranverse copper plates or bars 20. At the junction of middle bar 1A and plates 20, a vertical copper rod 21 is provided for suspending the anode 19 from the cover 22 of the electrolytic cell.

Bars 1A are provided with longitudinal grooves 2A on their lower sides. Titanium sheets 3A provided with apertures 6A, are inserted into grooves 2A. The manner of inserting titanium sheets 3A and finishing bars 1A may be as described in either of the above embodiments illustrated by FIGURES 4, 5 and 6, or other methods known in the art can be used.

All copper surfaces, that is bars 1A and 20 and rod 21, including flange 23, are covered with an ebonite layer 24 which overlaps onto the titanium sheets 3A.

Titanium anode plates 25 are attached to titanium sheets 3A by bolts 26 through apertures 6A and apertures 27 in vertical extensions 28 of plates 25. Each plate 25 is a flat sheet of titanium extending from the middle rod 1A to a point slightly beyond a side rod 1A. One plate 25 extends to each side of center rod 1A.

Figure 8:
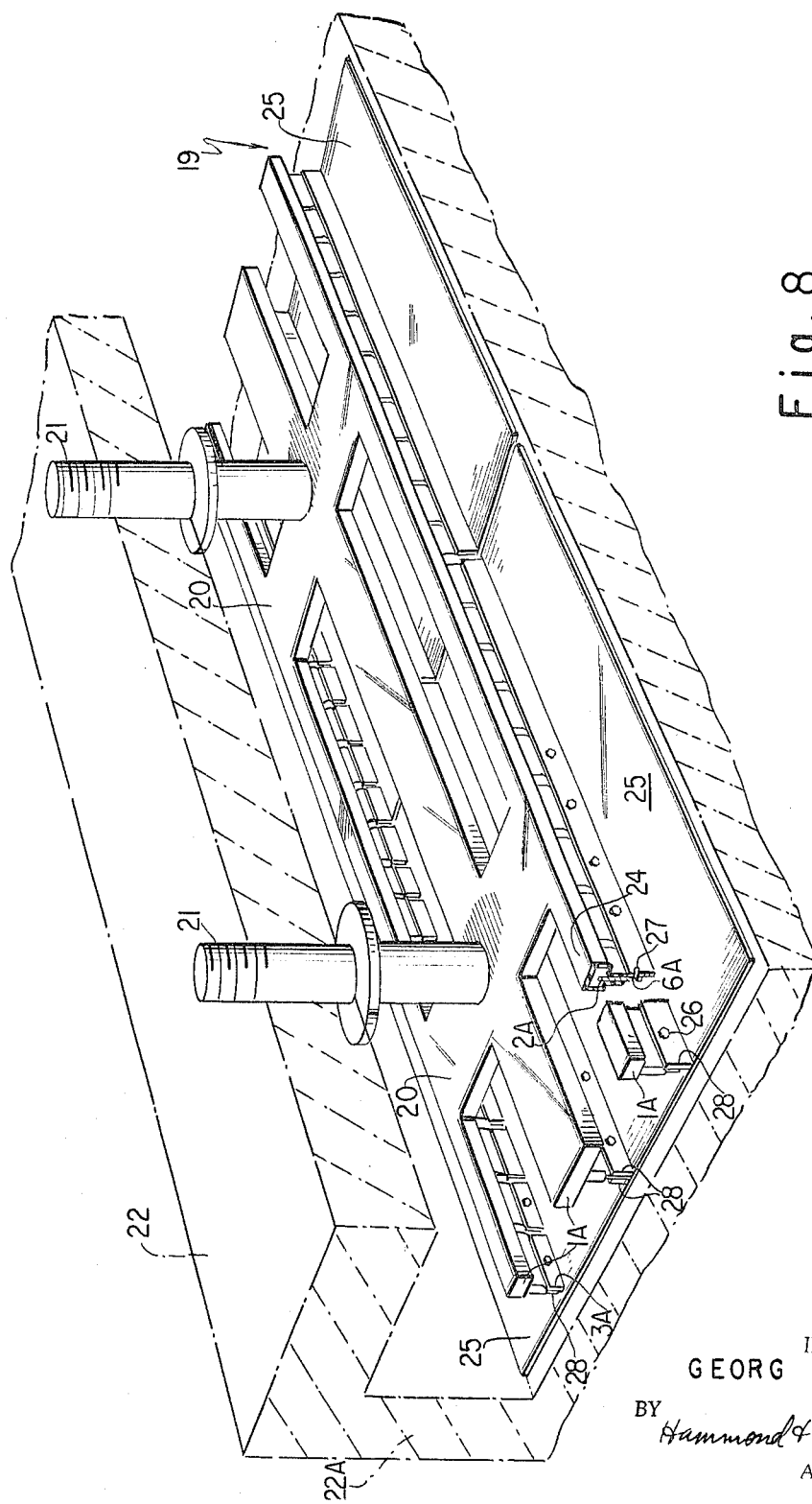
FIGURE 8 illustrates the anode structure of FIG. 1 in position in a horizontal type electrolytic cell.

The anode assembly 19 is suspended from the cover 22 of an electrolytic cell 22A (see FIG. 8) by passing copper rod 21 through an opening in cover 22. Rubber ring 29, washer 30 and nut 31 (see FIGS. 2 and 3) provide packing for rod 21 in cover 22. Nuts 32 are provided for attaching a soure of electrical current, such as a copper bus bar (not shown). Cell 22A is shown very generally and may be any one of various well known electrolytic cells.

The current supply of graphite anodes in an electrolytic cell from outside through the walls of the vessel can be constructed in accordance with a further embodiment of my invention (see FIG. 7) by means of round rods 8 made of tin-plated copper 6 m. long and 20 mm. in diameter. Copper rods 8 were packed into the cover 9 of the vessel, not shown, between flanges 10 with the aid of rubber rings 11. At the end facing the graphite anode 12 copper rod 8 was provided with a screw thread 13 which was 40 mm. long. Rod 8 was threaded with a cap 14 made of titanium metal 70 mm. long and provided with internal screw thread 15 and external screw thread 16. The two screw threads 15 and 16 of the titanium cap 14 were slightly platinized and the screw thread 13 of copper rod 8 was silver-coated or tin-coated.

After titanium cap 14 was threaded on copper rod 8, a layer of ebonite 17 was applied to the assembly which extended from the end of the external screw thread of the titanium to a few centimeters short of the other end of the copper rod, so that sufficient metal for connection of an external electrical conductor remained free.

The copper rod 8 which was thus protected against corrosion and provided with a satisfactorily current conducting platinized titanium screw thread 14 was then treadedly connected with the threaded well 18 of the graphite anode 12. After installation and packing of the portion of copper rod 8 provided with the ebonite cover in the wall of the vessel with the aid of rubber rings and pressure flanges, as described, a current load of 500 amperes was applied to the anode.

The loss of potential between the copper rod and the graphite anode measured to the nearest whole value was 4 millivolts under a load of 500 amperes. After partial consumption of graphite anodes 12, they can be readjusted after loosening the rubber ring packing by advancing the copper rod so that the original distance between anode and cathode is set and the original operating conditions are substantially restored.

When the point is reached that a further adjustment is no longer possible because of the advanced consumption of the graphite, the copper rod together with the titanium is disconnected from the remaining graphite and is immediately reconnected to a new graphite anode.

In a further embodiment of my invention, not illustrated, a tin-plated bus bar made of copper was bolted to a sand-blasted titanium sheet with steel bolts so that a good electrical contact was formed. The entire surfaces of the copper and the bolts were covered with ebonite in such a manner that the ebonite layer extended about 20 mm. over the titanium surfaces. The titanium sheet was provided with bore holes of 12 mm. diameter in those portions which were not covered with ebonite. The titanium sheet was further provided on one side with a microscopically thin platinum coating in a known manner within a circular zone of about 50 mm. external diameter surrounding each bore hole. Anodes made of graphite or platinized titanium may be attached to these platinized circular zones with the aid of graphite screws or titanium screws to provide a satisfactory electrical contact.

Figure 9:
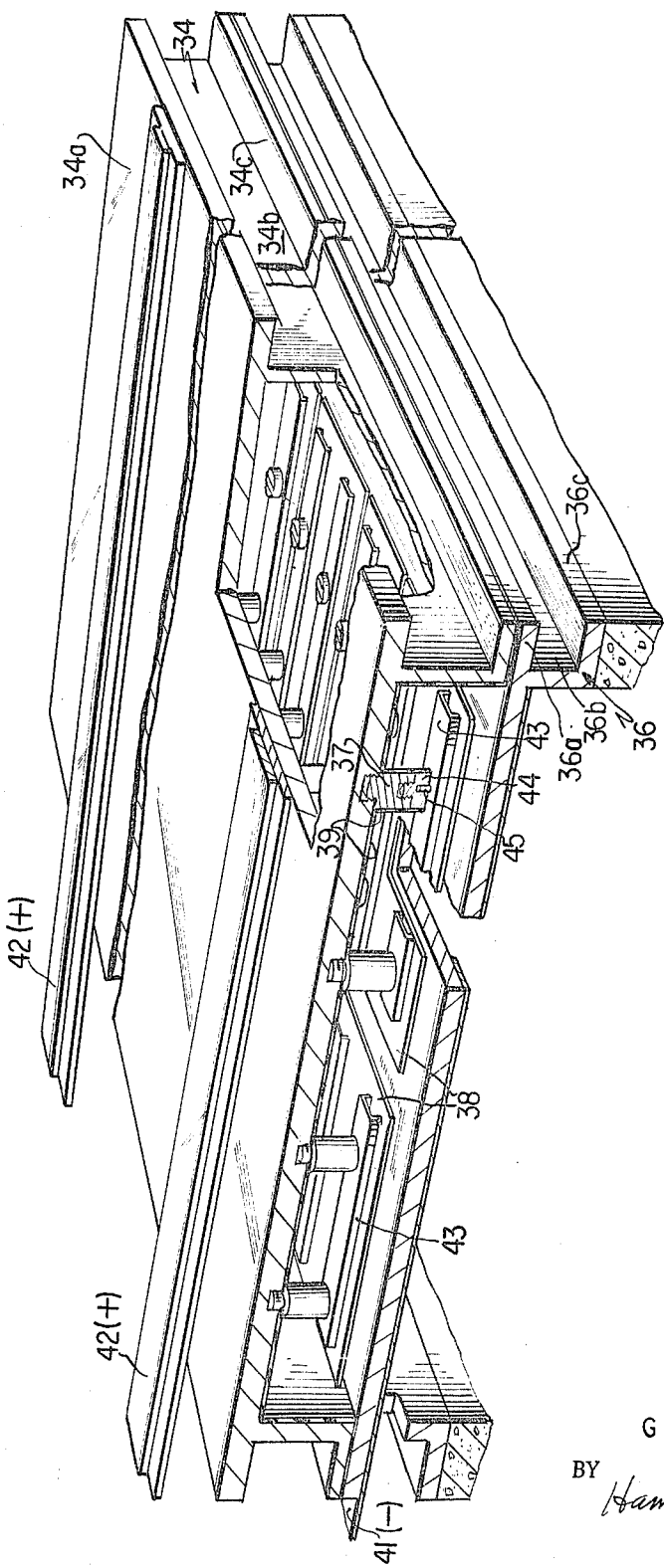
FIGURE 9 illustrates a perspective view of a horizontal electrolytic cell in partial cross-section with parts broken away to show arrangements of the anodes.

In FIGS. 9 and 10, my composite anode is shown in a permanent arrangement suspended from the inner surface of the upper part of the cell. FIG. 9 shows a cell having a single compartment. FIG. 10 shows stacked cells, with two cells superimposed wherein the intermediate partition between the cells acts as a base for the upper cell and a top for the lower cell. In other respects, the cells of FIGS. 9 and 10 are similar.

While the cell described herein may be operated in substantially horizontal position, i.e., sloping at an angle of less than 1° from the horizontal, it can also be operated as an inclined plane mercury cathode cell in which the cathodic cell bases, over which the mercury cathode flows, are inclined between about 2° to about 85° from the horizontal, as it has been found that better operating efficiencies may be secured in this way.

In the embodiment illustrated in FIG. 10, the cell comprises a terminal positive end frame 34, an intermediate frame 35 and a terminal negative frame 36. While only one intermediate frame 35 is shown, it will be understood that any number of intermediate frames 35 may be assembled between a positive and a negative end frame.

The positive end frame 34 (FIG. 10) comprises flanged upper plate or top member 34a having a dependent rim or frame 34b extending downward around the edges thereof, on four sides, so as to form an inverted box-like structure. At its lower edges the frame 34b is provided with integral outwardly extending flanges 34c by which it is connected with similar flanges of top 35a on the intermediate frame 35.

From the underside of plate 34a a plurality of anode supports 37, with the plate 34a, project downwardly and at the lower end of anode supports 37 anodes 38 are secured by screw connections 38a (FIG. 10). The underside of the plate 34a, which is cast iron, steel, nickel clad steel, or the like, sides 34b, flanges 34c and anode supports 37 are covered with insulating material 39 such as rubber, or the like, to protect these surfaces from corrosion and prevent current leakages from these surfaces. Instead of rubber-like electrical insulation, the underside of plate 34a, sides 34b, flanges 34c, anode 37 and other areas which need protection from the electrolyte and anodic conditions could be coated with titanium or similar valve metals which transmit current to the electrolyte only under cathodic conditions, or any other lining materials resistant to cell conditions may be used.

A spacer gasket 40 of insulating material is provided between the flanges 34c and 35a and the positive end frame member 34, the intermediate frame members 35 and the negative end frame member 36 are secured together by a plurality of bolts, not shown, which extend through holes in the flanges and are provided with nuts by which the flanges are held in fluid-tight contact against the gaskets 40. Adjustment of the spacing between the anodes and cathodes may be made by using spacer gaskets 40 of different thickness.

The intermediate frame members 35 are similar to end frame 34 in that the top plates 35a are provided with depending anode supports 37 for supporting the anodes 38 of the intermediate frames 35. However, the upper surfaces of the top plates 35a of intermediate frames 35 and the upper surface of top plate 36a of the negative end frame 36 act as the cathodic plates over which the mercury flows from end to end of the cell to provide the mercury cathodes for the cell tier. Top plate 35a acts as a bipolar member between the upper and lower electrolytic compartments and conducts current to the anodes suspended therefrom. The intermediate frame members and anode supports are insulated in the same manner as the bottom side of top frame 34.

At the upper end of the cell units formed by the intermediate frames 35 and of end frame 36 mercury from a suitable source is continuously fed into the cell compartments by any suitable means as well known in the art. The mercury flows down the upper surface of plates 35a and 36a to the amalgam outlets. An electrolyte solution, for example brine, is fed to the cell compartments by suitable means not shown.

The lower or terminal negative frame 36 resembles frame 35 in general. Plate 36a serves as the cathode base plate for an intermediate cell 35. However, the lower side of the negative terminal frame is not covered with an insulating material such as 39 used on the lower side of plate 35a. Terminal plate 36 further has no depending anode supports but may have a cross member.

A spacer gasket 40 of insulating material is likewise provided between the flanges 35c and 36a of frames 35 and 36 and these flanges are also bolted together by bolts 8 in the same manner described above between flanges 34c and 35a. The thickness of the spacer gaskets 40 controls the spacing of the anode faces from the cathode.

Along the lower side of plate 36a, a plurality of negative bus bars 41 are attached for providing the negative electrical terminal for the entire tier of bipolar cells. Positive bus bars 42 are provided across the top of plate 34a.

Suitable structural supporting elements 43 are positioned below frame 36 for maintaining the cells at the proper desired angle.

The anode plate 38 shown in FIGS. 9 and 10 may be a titanium plate, preferably with perforations, with a platinum coating on the underside. The plate 38 has cross-channel members 43 and these are connected to support 37, which may be copper, by an intermediate titanium member 44 by means of titanium screws 45.

The composite anode used in horizontal and inclined plane electrolyte cells thus may vary in certain structural details, but the basic structure remains the same.

While I have described certain specific embodiments of my invention, I do not intend to be limited thereby. It will be understood that various changes or modifications may be made in the invention without departing from the spirit of the disclosure or the scope of the appended claims.

I claim:

1. In combination with an electrolytic cell having four sides, a base and a cover, means to introduce an electrolyte solution into said cell, means to flow mercury over said base, and means to provide anodic and cathodic current to said cell; an anode assembly comprising copper supporting means depending from said cover and acting as conductive members, a substantially horizontal copper anode support plate, having openings therethrough connected to said depending copper conductive members, titanium connecting means attached to the lower face of said horizontal copper anode support plate and depending therefrom, anode plates attached to said titanium connecting means and spaced from said horizontal copper anode support plate, said anode plate being substantially parallel to said base, and a non-conductive, non-corrosive covering over said supporting means and the joint between said connecting and supporting means.

2. In combination with an electrolytic cell having four sides, a base and a cover, means to introduce an electrolyte solution into said cell, means to flow mercury over said base, and means to provide anodic and cathodic current to said cell; an anode assembly comprising copper supporting means depending from said cover and acting as conductive members, a substantially horizontal copper anode support plate, having openings therethrough connected to said depending copper conductive members, titanium connecting means attached to the lower face of said horizontal copper support plate, and depending therefrom, platinum coated, titanium anode plates attached to said connecting means, and spaced from said horizontal copper anode support plate, said anode plate being substantially parallel to said base, and a non-conductive, non-corrosive covering over said supporting means and the joint between said connecting and supporting means.

3. In combination with an electrolytic cell having four sides, a base and a cover, means to introduce an electrolyte solution into said cell, means to flow mercury over said base, and means to provide anodic and cathodic current to said cell; an anode assembly comprising copper supporting means depending from said cover and acting as conductive members, a substantially horizontal copper anode support plate, having openings therethrough connected to said depending copper conductive members, titanium connecting means attached to the lower end of said copper support plate, and depending therefrom, titanium anode plates attached to said connecting means, and spaced from said horizontal copper anode support plate, said anode plate being platinum coated on the side adjacent to said base and being substantially parallel to said base, and an ebonite covering over said copper supporting means and the joint between said titanium connecting and copper supporting means.

4. An anode assembly having high electrical and heat conductivity and corrosion resistance, comprising a copper member consisting of a substantially horizontal copper anode support plate, copper bus bars connected to said horizontal anode support plate and extending substantially vertically upward therefrom through the cover of an electrolytic cell and sheet titanium bar members extending into slots in said horizontal copper anode support plate and connected by pressure contact to said horizontal copper anode support plate to provide electrical conduction between said horizontal copper anode support plate and said sheet titanium bar members and a corrosion resistant plastic covering extending over said copper member and over the exposed joint between the copper member and said sheet titanium bar members, leaving portions of the titanium bar members extending therefrom, and platinum coated titanium anode plates removably attached to the uncovered parts of said titanium bar members.

References Cited by the Examiner
UNITED STATES PATENTS

| | | | |
|---|---|---|---|
| 2,258,435 | 10/1941 | Adolph et al. | 204—290 |
| 2,328,665 | 9/1943 | Munson | 204—250 |
| 2,786,810 | 3/1957 | Brown | 204—219 |
| 2,919,237 | 12/1959 | Szechtman | 204—219 |
| 2,987,453 | 6/1961 | Du Rose | 204—290 |

FOREIGN PATENTS 569,500  1/1959  Belgium.

JOHN H. MACK, *Primary Examiner.*

WINSTON A. DOUGLAS, HOWARD S. WILLIAMS, *Examiners.*

A. SKAPARS, E. ZAGARELLA, *Assistant Examiners.*